US008745136B1

(12) United States Patent
Morrison

(10) Patent No.: US 8,745,136 B1
(45) Date of Patent: Jun. 3, 2014

(54) INCOMING AND OUTGOING PRIVACY SETTINGS IN SOCIAL NETWORKS

(75) Inventor: Ryan Morrison, San Francisco, CA (US)

(73) Assignee: Google Inc., Mountain View, CA (US)

( * ) Notice: Subject to any disclaimer, the term of this patent is extended or adjusted under 35 U.S.C. 154(b) by 78 days.

(21) Appl. No.: 13/368,058

(22) Filed: Feb. 7, 2012

(51) Int. Cl.
*G06F 15/16* (2006.01)

(52) U.S. Cl.
USPC .......................................... 709/204; 705/319

(58) Field of Classification Search
CPC .............. H04L 67/1044; H04L 12/185; H04L 67/1059; H04L 29/08387; H04L 29/0836; H04W 4/08
USPC .......................................... 709/204; 705/319
See application file for complete search history.

(56) References Cited

U.S. PATENT DOCUMENTS

| | | | | |
|---|---|---|---|---|
| 2010/0137010 | A1* | 6/2010 | Counts et al. | 455/466 |
| 2010/0169136 | A1* | 7/2010 | Kho et al. | 705/7 |
| 2011/0131663 | A1* | 6/2011 | Kaikuranta et al. | 726/28 |
| 2011/0265011 | A1* | 10/2011 | Taylor et al. | 715/751 |
| 2011/0270774 | A1* | 11/2011 | Varshavsky et al. | 705/319 |
| 2011/0276629 | A1* | 11/2011 | Canning et al. | 709/204 |
| 2011/0307551 | A1* | 12/2011 | Danezis et al. | 709/204 |
| 2012/0084188 | A1* | 4/2012 | Zuber | 705/34 |
| 2012/0109835 | A1* | 5/2012 | Barefoot et al. | 705/319 |
| 2012/0110052 | A1 | 5/2012 | Smarr et al. | |
| 2012/0209998 | A1* | 8/2012 | Svarfvar et al. | 709/225 |
| 2013/0018960 | A1* | 1/2013 | Knysz et al. | 709/204 |

* cited by examiner

*Primary Examiner* — Patrice Winder
*Assistant Examiner* — Eyob Hagos
(74) *Attorney, Agent, or Firm* — Procopio, Cory, Hargreaves & Savitch LLP

(57) ABSTRACT

Methods, systems, and apparatus, including computer programs for defining a first group of contacts, the first group of contacts having been specified by a first user of a social networking service and including contacts of the first user within the social networking service, each contact in the first group of contacts being associated with a first sub-group of contacts within the first group of contacts, the first group of contacts being associated with a distribution scheme for digital content provided by the first user within the social networking service, and associating, based on first input provided by the first user, one or more contacts of the first sub-group of contacts with a second sub-group of contacts within the first group of contacts, the second sub-group of contacts including contacts for which at least some digital content distributed to the first user is filtered from display to the first user.

26 Claims, 10 Drawing Sheets

FIG. 4

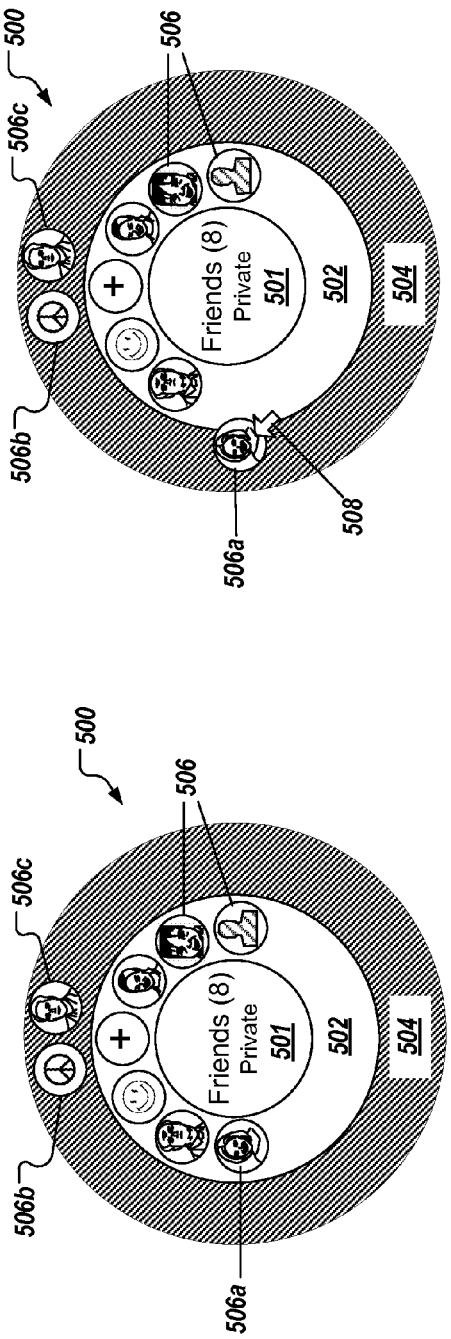
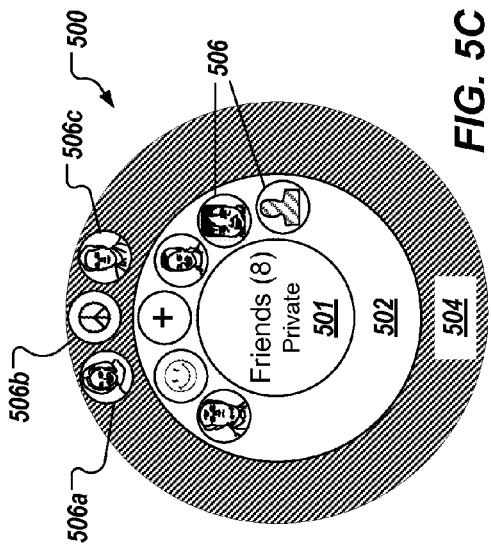
FIG. 5A
FIG. 5B
FIG. 5C

*FIG. 8*

Search   Mail   Social.Network   Videos   Books   More....

[ Search ]

Rob McDavies
view profile

Stream

◉ Friends
○ Family
○ Coworkers
4 more ▽

Incoming
News
Videos
Circles
Gadgets & Games
Questions
Music
Photos

Friends

Share what's new ....

Tamara added you and four others to her Circles      2 hours ago — 602
Endorse   Comment   Share                              ◉ Public

Harold Is anyone else going to the baseball game tonight?   3 hours ago — 604
Endorse   Comment   Share                              ◉ Public

Sarah Don't forget to vote today!
There are a lot of important issues on the ballot this year.

Irene and 5 others endorse this
  Tamara – Who are you voting for? 8:00 pm
  Irene – You voted early this time. 8:43 am Endorse   Comment   Share           4 hours ago — 800
                                    ◉ Public

400

INCOMING AND OUTGOING PRIVACY SETTINGS IN SOCIAL NETWORKS

TECHNICAL AREA

This specification relates to social networks, and particularly to digital content distribution over social networks.

BACKGROUND

Internet-based social networking services provide a digital medium for users to interact with one another and share information. For examples, users are able to distribute digital content (e.g., textual comments, digital images, digital videos, digital audio, hyperlinks to websites, etc.) to other users that they might be connected with in the social networking service. Digital content that is distributed to a user can be displayed to the user in a stream page.

As a user's social network within the social networking service increases, the amount of digital content distributed to the user and the amount of digital content that the user interacts with can significantly increase. Consequently, the user's stream page can overwhelm the user with digital content, which can include digital content that might not be relevant to the user and/or digital content that might be of low quality (e.g., spam).

SUMMARY

In general, innovative aspects of the subject matter described in this disclosure may be embodied in methods that include the actions of defining a first group of contacts specified by a first user of a social networking service, each contact in the first group of contacts being associated with a first sub-group of contacts within the first group of contacts. The first group of contacts is associated with a distribution scheme for digital content provided by the first user within the social networking service. Based on first input provided by the first user, one or more of the contacts of the first group of contacts are associated with a second sub-group of contacts within the first group of contacts. The second sub-group of contacts includes contacts for which at least some digital content distributed to the first user is filtered from display to the first user based on first input provided by the first user.

In some implementations, an item of digital content and a distribution associated with the item of digital content may be defined based on input provided by the first user. The distribution may include the first group of contacts. The item of digital content may be distributed to contacts within both the first sub-group of contacts and the second sub-group of contacts through the social networking service.

In some implementations, an item of digital content and a distribution associated with the item of digital content may be defined based on input provided by a second user of the social networking service. The distribution may include the first user. The item may be excluded from items that are to be displayed to the first user, based at least in part on determining that the second user is a member of the second sub-group. The item may also be excluded in response to determining that the item of digital content includes a specified type of digital content. The specified type may be music, hyperlinks, photos, videos, or games.

In some implementations, item of digital content and a distribution associated with the item of digital content may be defined based on input provided by a second user of the social networking service. The distribution may include the first user. The item may be included in items that are to be displayed to the first user, at least partially in response to determining that the second user is a member of the first sub-group.

A second item of digital content and a second distribution associated with the second item of digital content may also be defined based on input provided by a third user of the social networking service. The second distribution may also include the first user. The second item may be excluded from items that are to be displayed to the first user at least partially in response to determining that the third user is a member of the second sub-group. The items that are to be displayed to the first user are displayed, including the item of digital content from the second user and excluding the second item of digital content from the third user.

In some implementations, the methods may further include associating, based on second input provided by the first user, one or more contacts of at least one of the first sub-group of contacts and the second sub-group of contacts with a third sub-group of contacts within the first group of contacts. The third sub-group of contacts may include contacts for which all digital content distributed to the first user is filtered from display to the first user.

In some implementations, the second sub-group of contacts includes contacts for which all digital content distributed to the first user is filtered from display to the first user.

Other implementations of this aspect include corresponding systems, apparatus, and computer programs, configured to perform the actions of the methods, encoded on computer storage devices.

This disclosure further includes innovative aspects that may be embodied in methods that include the actions of creating, using the one or more computing devices, a first group of digital contacts, the first group of digital contacts having been specified by a first user of a social networking service and including digital contacts of the first user within the social networking service, the first group of digital contacts being associated with a distribution scheme for digital content provided by the first user within the social networking service; associating, using the one or more computing devices, based on first input provided by the first user, one or more digital contacts from the first group of contacts with a second sub-group of contacts; receiving, at the one or more computing devices, an indication of an item of digital content and a distribution associated with the item of digital content from a second user of the social networking service, the distribution including the first user; determining, using the one or more computing devices, that the second user is a member of the second sub-group; and, based at least in part on determining that the second user is a member of the second sub-group, excluding the item of digital content from the second user from items that are to be displayed to the first user.

In some implementations, the actions may further include determining that the item of digital content is associated with a predefined type of digital content, wherein excluding the item of digital content from items that are to be displayed to the first user includes excluding the item of digital content based at least in part on determining that the second user is a member of the second sub-group and determining that the item of digital content is associated with a predefined type of digital content.

In some implementations, the actions may further include receiving, at the one or more computing devices, an indication of a second item of digital content and a second distribution associated with the second item of digital content from a third user of the social networking service, the second distribution including the first user; determining that the third user is not a member of the second sub-group; and, at least partially based on determining that the second user is not a member of the second sub-group, including the second item of digital content in items that are to be displayed to the first user. These implementations may further include displaying the items that are to be displayed to the first user, including the second item of digital content from the third user and excluding the item of digital content from the second user.

Implementations of the present disclosure provide one or more of the following example advantages. Implementations increase the relevance of the social networking service to the users by selectively displaying items that might be more relevant to respective users. Implementations promote conversational use of the social networking service and help ensure that users do not miss important content. Implementations also enable users to use their time more efficiently by filtering out unwanted content.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 4 depicts a screen-shot of an example stream page for a user of a social networking service.

FIGS. 5A-5C depict an example graphical user interface (GUI) for managing contact digital content within a social circle.

FIG. 8 depicts a screen-shot of the example stream page of FIGS. 4 and 6 showing the results of the contact digital content management shown in FIGS. 7A-7C.

Like reference numbers represent corresponding parts throughout.

DETAILED DESCRIPTION

1. Introduction

Figure 1:
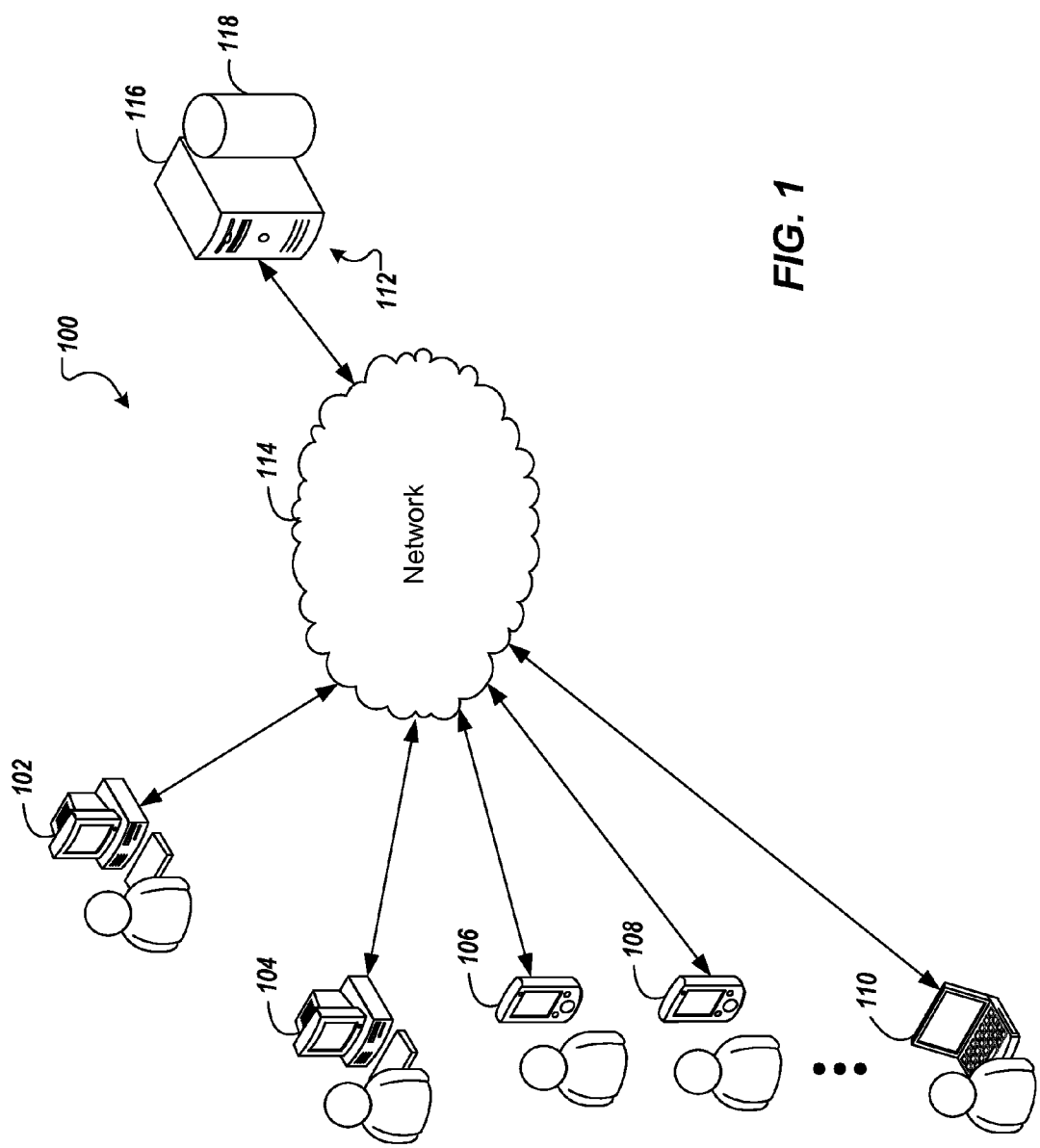
FIG. 1 is a diagram of an example network architecture.

In general, implementations of the present disclosure are directed to displaying items in stream pages of users of a social networking service. In particular, implementations of the present disclosure are directed to enabling a user to select, for a particular grouping of contacts, which digital content from which contact is displayed to the user within a stream page of the user. That is, in some implementations, the user can filter digital content from being displayed on a per-grouping, per-contact basis. In some implementations, the user can filter digital content from being displayed on a per-grouping, per-contact, per-digital content type basis.

The stream page displays digital content that has been posted by the user to the social networking service and/or digital content distributed to the user through the social networking service. In some examples, each contact within a given social grouping (e.g., social circle, discussed in further detail herein) is associated with at least one of a first sub-group and a second sub-group. In some examples, the user can distribute digital content to contacts in both the first sub-group and the second sub-group, while only receiving digital content distributed by contacts within the first sub-group. In this manner, the user can filter received digital content from particular contacts within a social grouping, while still being able to distributed digital content to all contacts within the social grouping. In some implementations, types or categories of digital content can be filtered from display on a per-grouping, per-contact basis. In some examples, the user can select one or more digital content types to be displayed in the user's stream page on a per-user basis for a given social grouping. In some implementations, there may be different sub-groups associated with different filter settings, such that associating a contact a particular sub-group is sufficient to indicate which digital content types to filter.

2. Example Social Networking Service

For purposes of illustration, an example social networking service will be described. The example social networking service enables users to organize contacts into social groupings referred to as social circles. It is appreciated, however, that implementations of the present disclosure can be used in other types of social networking services and are not limited to social networking services that include social circles.

In general, social circles are categories to which a user can assign contacts and better control the distribution and visibility of social networking posts and/or other digital content distributed using the social networking service. In some implementations, a social circle can be provided as a data set defining a collection of contacts that are associated with one another in a computer-implemented social networking service. Generally, a social circle can be described from the perspective of an individual that is the center of a particular collection of socially interconnected people, or from the aggregate perspective of a collection of socially interconnected people. A social circle can have narrowly defined boundaries (e.g., members of the social circle might be familiar with one another) and permission may be required for a member to join a social circle. A user of the social networking service can define a social circle. The social circle, as a data set defining a collection of contacts, may reflect real-life social connections and/or interactions of the user. In some implementations, a social circle can be defined by a user as a personal representation or grouping of a set of contacts, the contacts may be unaware of the social circle and/or unaware of other members of the social circle.

Through the creation and use of social circles, the user can organize and categorize social networking contacts into various different groupings that can be used to control the visibility and access those contacts have to the user's postings, digital pictures, videos, audio files, hyperlinks (e.g., uniform resource indicators, URIs), and/or other content associated with the user's social networking profile. As one example, the user can post an update about a work-related nuance to only a "coworker" circle, and spare other contacts within the social networking service from seeing information that is irrelevant to them.

FIG. 1 is a diagram of an example network architecture 100. The network architecture 100 includes a number of client devices 102-110 communicably connected to a server system 112 by a network 114. The server system 112 includes a processing device 116 and a data store 118. The processing device 116 executes computer instructions (e.g., social network computer program code, and/or IM computer program code) stored in the data store 118 to perform the functions of a social network server and/or IM server.

Users of the client devices 102-110 access the server device 112 to participate in a social networking service. For example, the client devices 102-110 can execute web browser applications that can be used to access the social networking service and/or an IM service. In another example, the client devices 102-110 can execute software applications that are specific to the social networking service and/or the IM service (e.g., social networking and/or IM "apps" running on smartphones).

Users interacting with the client devices 102-110 can participate in the social networking service provided by the server system 112 by digital content, such as text comments (e.g., updates, announcements, replies), digital images, videos, audio files, and/or other appropriate digital content. In some implementations, information can be posted on a user's behalf by systems and/or services external to the social networking service or the server system 112. For example, the user may post a review of a movie to a movie review website, and with proper permissions that website may cross-post the review to the social networking service on the user's behalf. In another example, a software application executing on a mobile device, with proper permissions, may use global positioning system (GPS) capabilities to determine the user's location and automatically update the social network with his location (e.g., "At Home", "At Work", "In Brownsdale, Minn."). Generally, users interacting with the client device 102-110 can also use the social networking service provided by the server system 112 to define social circles to organize and categorize the user's relationships to other users of the social networking service. Examples of the creation and use of social circles are provided in the description of FIG. 2.

In some implementations, the client devices 102-110 can be provided as computing devices such as laptop or desktop computers, smartphones, personal digital assistants, portable media players, tablet computers, televisions with one or more processors embedded therein or coupled thereto, or other appropriate computing devices that can be used to communicate with an electronic social network. In some implementations, the server system 112 can be a single computing device such as a computer server. In some implementations, the server system 112 can represent more than one computing device working together to perform the actions of a server computer (e.g., cloud computing). In some implementations, the network 114 can be a public communication network (e.g., the Internet, cellular data network, dialup modems over a telephone network) or a private communications network (e.g., private LAN, leased lines).

Figure 2:
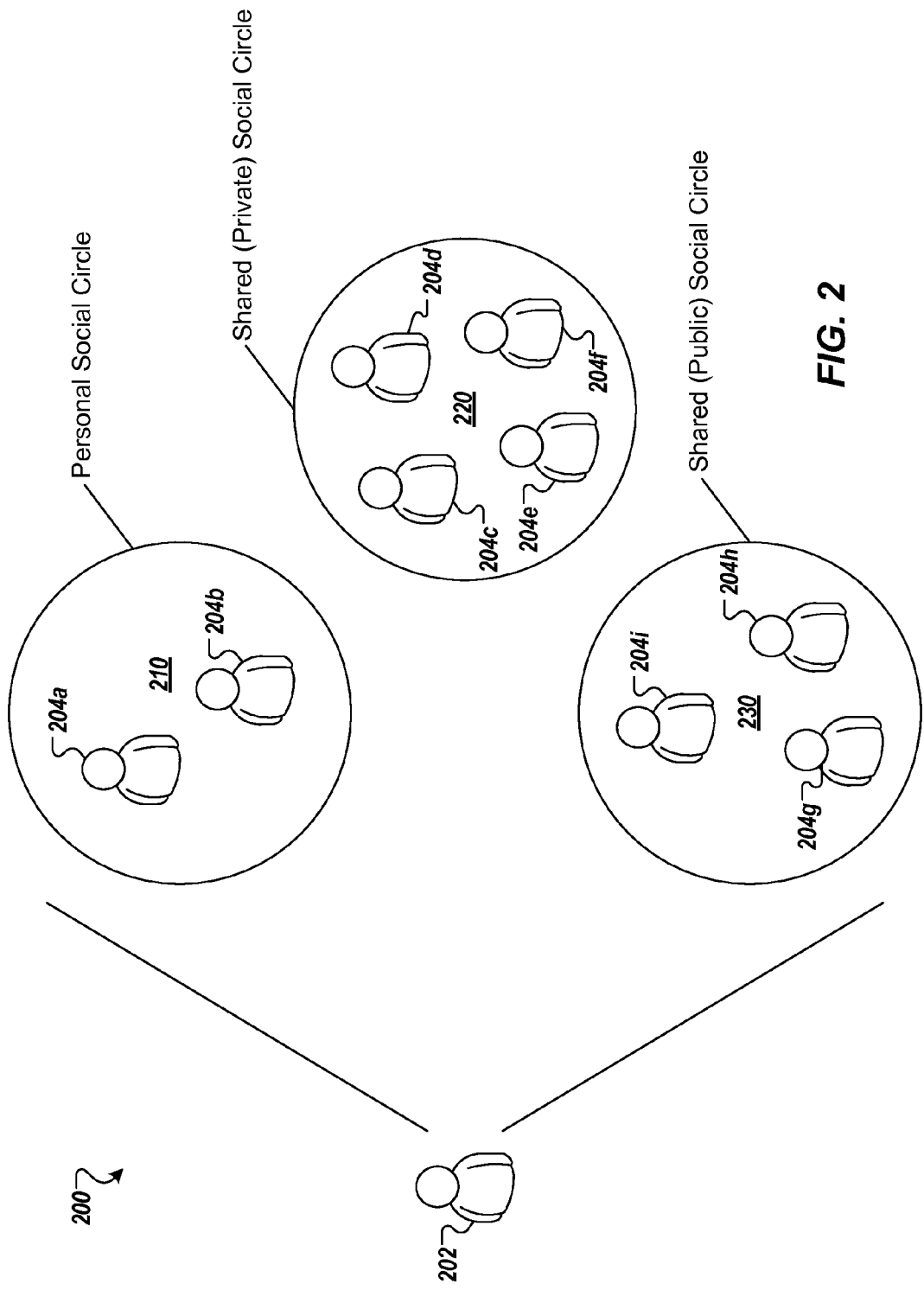
FIG. 2 is a diagram of an example social network including social circles.

FIG. 2 is a diagram of an example social network 200 including social circles. A user 202 is a member of a social network that supports the creation and use of social circles (e.g., the social network provided by the server device 112 of FIG. 1). In the present example, the user 202 has a number of contacts 204a-204i with which the user 202 can have some form of relationship (e.g., friends, coworkers, customers, teammates, clients, relatives, club members, classmates). The user 202 categorizes the contacts 204a-204i by assigning them to one or more social circles, such as a social circle 210, a social circle 220, and a social circle 230.

The social circle 210 is a personal circle. In some implementations, personal circles are groupings created by and may be known only to the user 202 (e.g., the contacts 204a, 204b may receive no indication that they are in the user's 202 personal social circle 210). In some implementations, personal social circles are groupings created by the user 202 and may be known to the user 202 as well as the contacts (e.g., contacts 204a, 204b) that are members of the social circle (e.g., the contacts 204a, 204b receive an indication that they have been added to the personal social circle 210).

In some implementations, personal circles may be used to organize and categorize the contacts 204a-204i in ways that are relevant to the user 202. In some implementations, the user 202 may use personal social circles to organize contacts in order to discretely target which of his contacts 204a-204i will see certain postings or have access to particular information. For example, the user 202 may be planning a surprise party for a small group of friends. As such, the user can organize contacts into "Surprise Party Attendees" and "Surprise Party Honorees" personal circles. By doing so, the user 202 may better target selected postings to the friends attending and/or helping to plan the surprise party (i.e., Surprise Party Attendees), while targeting selected postings to friends that are to be honored at the surprise party (i.e., Surprise Party Honorees) to maintain the integrity of the surprise.

The social circle 220 is a shared private circle, which may also be referred to simply as a shared circle. In general, shared private circles are social circles that the user 202 creates and invites contacts to voluntarily join. Contacts that accept the invitation become members of the shared private circle. Members of a shared private circle can see information posted to that circle by the user 202 and can post information to be shared with other members of the shared private circle. For example, the user 202 may tend to post a large number of jokes to the social network. However, while some of the contacts 204a-204i may find the jokes to be entertaining, others may find them to be simply annoying. Realizing this, the user 202 may create a "jokes" shared private circle and invite some or all of the contacts 204a-204i to join. With the "jokes" social circle in place, the user 202 may post witticisms to the "jokes" circle, and only those contacts who have accepted the invitation are able to see the comicality of the user 202. Similarly, members of the shared private circle are able to post messages to the circle, and those posts are visible to other members of that circle.

The social circle 230 is a shared public circle. In general, shared public circles are social circles that the user 202 creates, and invites contacts to voluntarily join. Further, the existence of a shared public circle is publicly available such that other users of the social networking service (e.g., not necessarily just the user's 202 contacts 204a-204i) may request to join the public social circle. Members of shared public circles may post information to, and see updates posted by, other members of the same public shared circle. In some implementations, public shares circles may be "fan" or "group" circles (e.g., circles dedicated to a particular place, event, product, movie, celebrity, sports team, company, concept, philosophy, organization, support network). For example, the user 202 may create a shared public circle for his band, and fans of his act may join the circle to discuss upcoming shows, download MP3s of the band's music, or post videos from recent concerts. In another example, the user 202 may create a shared public circle for alumni of his high school graduating class, which his former classmates may find and join in order to stay in touch with one another and post pictures from their school days. Once a shared public circle is created, in some implementations the user 202 can invite people to join the circle. In some implementations, nonmembers of the circle can request membership in the shared public circle, and membership in a shared public circle may be automatic upon request, or may require the user's 202 approval to become members of the shared public circle.

A given contact may be placed in several of the user's 202 social circles. For instance, a single contact may be a friend and coworker of the user 202, fan of the user's 202 jokes, a follower of the user's 202 band, and a surprise party attendee. The single contact therefore may be present in several of the user's 202 social circles, including multiple private and public circles.

In some implementations, one or more default social circles can be provided or suggested to a user when the user subscribes to a social networking service. For example, "Friends," "Family," and "Coworkers" social circles can automatically be provided in a user's profile upon the user subscribing to the particular social networking service. Other social circles can automatically be provided including, for example, an "Acquaintances" social circle and/or a "Just Following" social circle. In some implementations, the automatically created or suggested social circles can include personal social circles. Although default social circles can be automatically provided, it may be left to the user to actually populate the default social circles with contacts. For example, each of the default social circles may initially be empty of contacts, and the user populates each of the default social circles as discussed in further detail herein.

As discussed herein, digital content can be distributed to contacts within the social networking service including one or more social circles, such that they are exclusively viewable by the indicated contacts and/or contacts within one or more indicated social circles. For example, a user of the social networking service can generate a post and indicate one or more social circles for distribution of the post. In some implementations, an auto-complete component enables the user to type in part of the name of a social circle and/or individual contact to specify which social circles and/or individual contacts require delivery of the post content. During a post write-time, a post data set is transmitted from the user's client computing device (e.g., client device 102 of FIG. 1) to a distribution hub, which can be provided at a server (e.g., server system 112 of FIG. 1). The post data set includes a plurality of data. In some implementations, the post data set includes post content data (e.g., text, uniform resource indicator (URI)), timestamp data (e.g., a timestamp indicating the time that the post was generated), distribution data (e.g., contacts and/or one or more social circles), and identification (ID) data (e.g., an ID assigned to the post data set upon generation of the post).

In some implementations, the distribution data is processed to provide an access control list (ACL) that specifies which contacts within the social networking system are granted access to the post content. Generally, the distribution hub determines end points to which the post data set is to be distributed based on the ACL. More specifically, the set of contacts that may care about the post and/or that are allowed access to the post is determined based on the ACL, and the ID of the post is written to a per user/view index at the distribution hub. When fetching posts to distribute to a user, the user/view index is accessed and the IDs of the various posts that the user is allowed to view are determined. The post data sets are retrieved from a data store (e.g., data store 118 of FIG. 1) and are transmitted to a client device associated with the requesting user.

Figure 3:
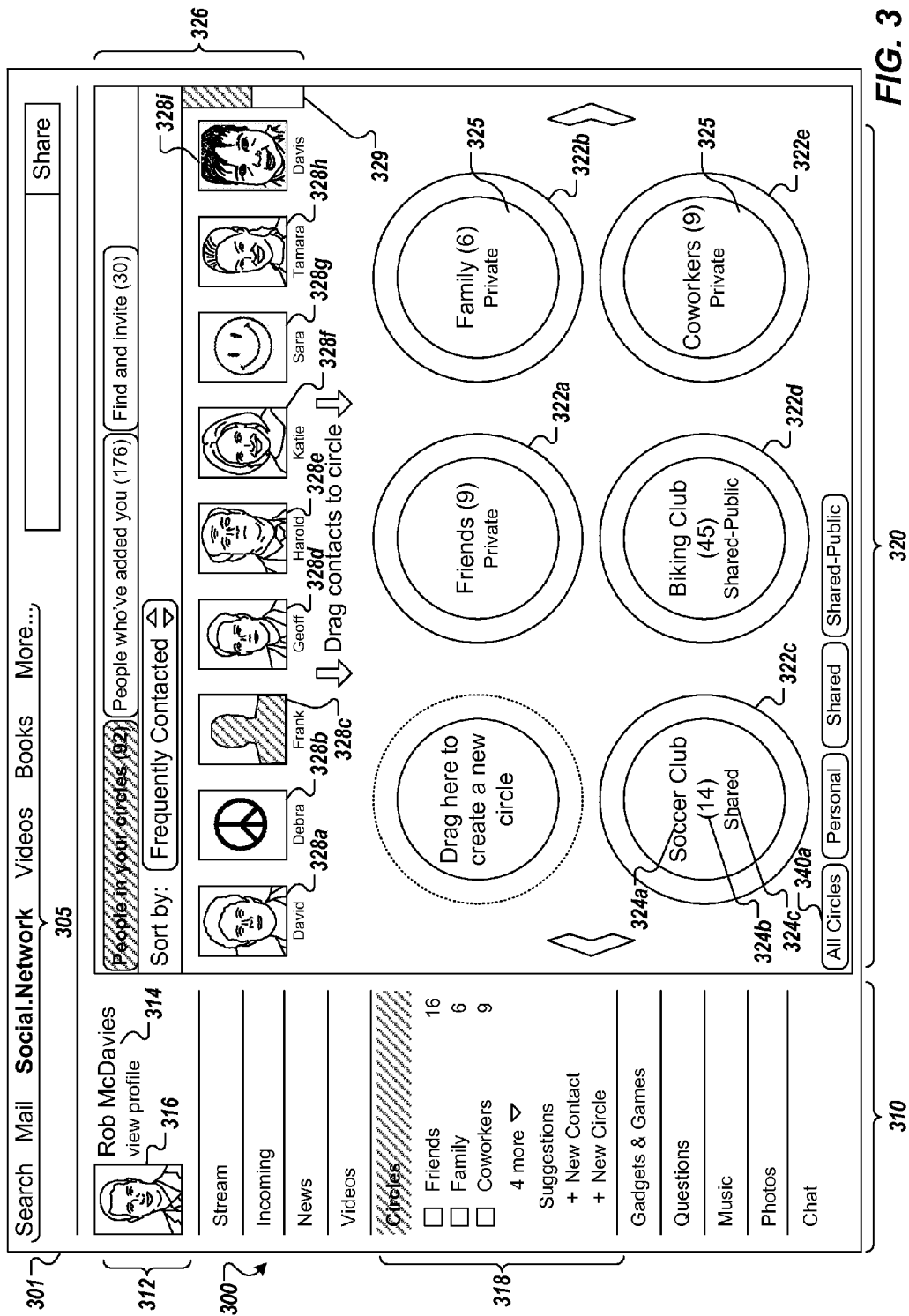
FIG. 3 depicts a screen-shot of an example graphical user interface for creating and maintaining social circles.

FIG. 3 depicts a screen-shot 300 of an example graphical user interface for creating and maintaining social circles. In the screen-shot 300, a social graph editor user interface (UI) 301 is shown. In some implementations, the UI 301 can be the interface presented by a purpose made social networking application, while in some implementations the UI 301 can be one or more web pages of a social networking website displayed in a general purpose web browser.

In the example of FIG. 3, the UI 301 includes a number of choices presented in a menu bar 305. In the present example, the "Social Network" choice has been selected by a user. This selection causes a web-based social networking application to be executed and a social network menu 310 to be displayed. The social network menu 310 includes a profile indicator 312 in which information such as a user name 314 and a user image 316 associated with the currently logged in user are displayed.

The social network menu 310 also displays, among other items, a social circles sub-menu 318. The social circles sub-menu 318, when selected (e.g., as represented by the highlighting of the submenu's title), causes a social circle display 320 to be presented. The social circle display 320 includes a number of circles 322a-322e that are visual representations of various social circles that the user has created or has permission to edit. Each of the circles 322a-322e displays information about the social circle it represents. For example, the circle 322c displays a name 324a, a count 324b of the number of contacts associated with the social circle, and an indication 324c of what kind of circle (e.g., personal, private shared, public shared) that the circle 322c is.

The social circle display 320 also includes a contact display 326. The contact display 326 provides a graphical interface for viewing, selecting, and organizing items in the user's contact lists. A collection of contact icons 328a-328i represents the contacts or other entities (e.g., organizations, places, or other items) socially networked with the particular user. In some implementations, the icons can be digital photos of the contacts they represent (e.g., the icons 328a, 328d), arbitrary images (e.g., the icons 328b, 328g), or placeholders (e.g., when the contact has no image associated with their account, such as the icon 328c). In some implementations, the icons can include additional information, such as the names of each contact. A scroll bar 329 is provided for the user to view additional contact icons that may not fit into the initial view.

Figure 4:
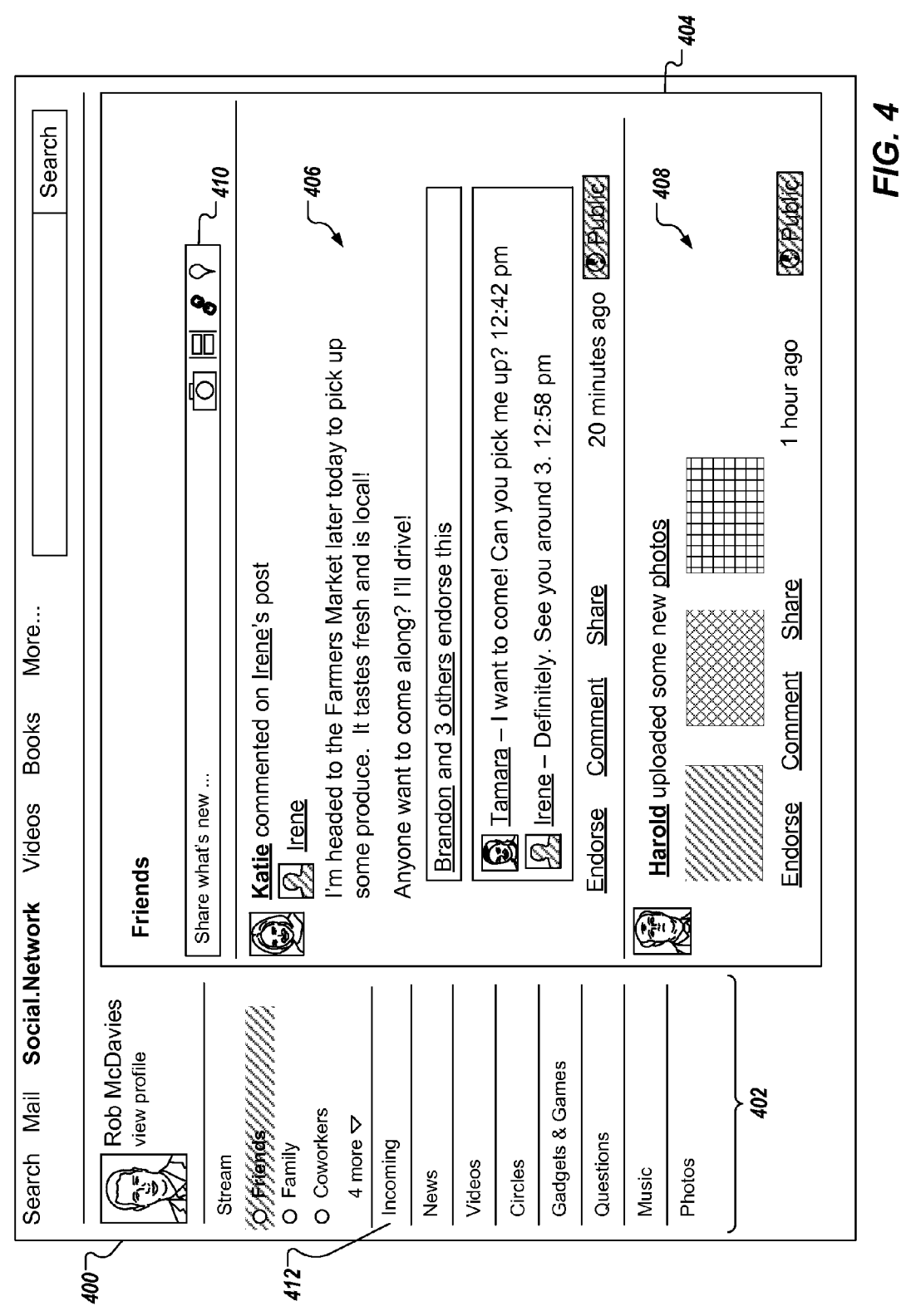

FIG. 4 depicts a screen-shot of an example stream page 400 for a user of a social networking service. For example, the stream page 400 can be provided as a web page within a website of a social networking service, and can display digital content that has been shared with a user associated with the stream page 400. In the illustrated example, the example user includes "Rob McXYZ" and the stream page 400 includes members of the user's "Friends" social circle. The "Friends" stream page 400 displays items (i.e., digital content) that other users in the "Friends" social circle have shared with the user and/or items that the user has shared with the other users. The stream page 400 includes a social network menu 402 and an item region 404. Example items 406, 408 that have been distributed to the user are displayed in the item region 404. Generally, the items 406, 408 displayed in the item region 404 include digital content that is distributed to the user from contacts established within the social networking service. A content sharing interface 410 can also be provided in the item region 404. The user can activate (e.g., click on) the content sharing interface 410 to share digital content. Although two items 406, 408 are depicted in FIG. 4, it is appreciated that the stream page 400 can display any number of items to the user.

3. Privacy Settings

Implementations of the present disclosure are directed to determining which items to display to the user within a stream page of the user of the social networking service based on user-provided privacy settings. In some examples, each item of digital content and the sender of the item can be checked against social circle sub-groups defined by the user and/or digital content types selected by the user to determine whether the digital content is displayed.

FIGS. 5A-5C depict an example graphical user interface (GUI) 500 for managing contact digital content within a social circle. In some examples, the GUI 500 is a graphical representation of a particular social circle. In the depicted example, the GUI 500 is a graphical representation of the "Friends" social circle of FIG. 3. The GUI 500 includes concentric regions. A center region 501 provides information regarding the social circle (e.g., name, number of contacts assigned to the social circle, type of social circle). Outer regions 502, 504 represent respective sub-groups to which contacts of the social circle can be assigned. As discussed in further detail herein, each sub-group includes associated filtering to define which digital content from which contacts is to be displayed to a user.

Each contact that is a member of the social circle is graphically represented as an icon 506. Placement of the icons 506 within the regions 502, 504 can be used to define which sub-group the particular contacts are assigned to. In the depicted example, the icons 506 can be located in either the region 502 or the region 504, where the region 502 represents contacts whose digital content that is distributed to the user will be displayed to the user, and the region 504 represents contacts whose digital content distributed to the user will be filtered from display to the user. Further, digital content distributed by the user to the social circle represented by the GUI 500 will be distributed to each of the contacts associated with the icons 506 (unless one or more contacts have established similar filter settings). In this manner, the user can regulate digital content that is displayed on a per-contact, per-social circle basis, while still being able to distribute digital content to all contacts of the social circle.

Referring to FIGS. 4 and 5A-5C, the example "Friends" stream page 400 corresponds to the configuration of sub-groups of the "Friends" social circle as provided in FIG. 5A. In the example GUI 500, an icon 506a that represents a contact "Katie" is located within the region 502. Consequently, digital content distributed to the user from the contact "Katie" appears in the stream page 400. Icons 506b, 506c, respectively representing the contacts "Debra" and "Geoff," are located in the region 504. Consequently, digital content distributed to the user from the contacts "Debra" and/or "Geoff" does not appear in the stream page 400.

The icons 506 can be moved between the regions 502, 504 to change filter settings. In some implementations, a drag-and-drop technique can be used to move icons 506 between regions 502, 504. FIGS. 5B and 5C depict the use of a cursor 508 to drag the "Katie" icon 506a from the region 502 to the region 504. In this manner, the contact "Katie" is added to the set of excluded contacts, whose digital content will not be displayed to the user.

Figure 6:
FIG. 6 depicts a screen-shot of the example stream page of FIG. 4 showing the results of the contact digital content management shown in FIGS. 5A-5C.

FIG. 6 depicts a screen-shot of the example stream page 400 of FIG. 4 showing the results of the contact digital content management shown in FIGS. 5A-5C In particular, FIG. 6 depicts the example "Friends" stream page 400 corresponding to the settings defined in FIG. 5C using the GUI 500. As discussed above, placement of the icon 506a (associated with the contact "Katie") results in digital content distributed by the contact "Katie" to the user being filtered from display to the user. Consequently, the item 406 associated with the contact "Katie" is no longer displayed in the stream page 400. Instead, items 408, 600, 602, 604 are displayed. More specifically, items 408, 600, 602, 604 are associated with the contacts "Harold" and "Tamara" and are displayed, because icons associated with the contacts "Harold" and "Tamara" are located in the region 502 in FIG. 5C.

Figure 7B:
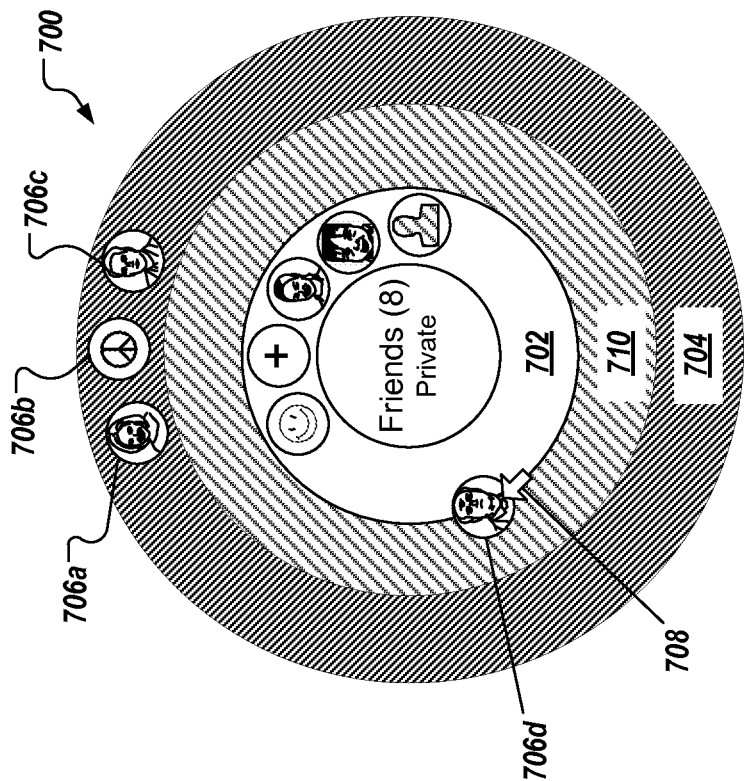
FIGS. 7A-7C depict another example GUI for managing contact digital content within a social circle.
Figure 7A:
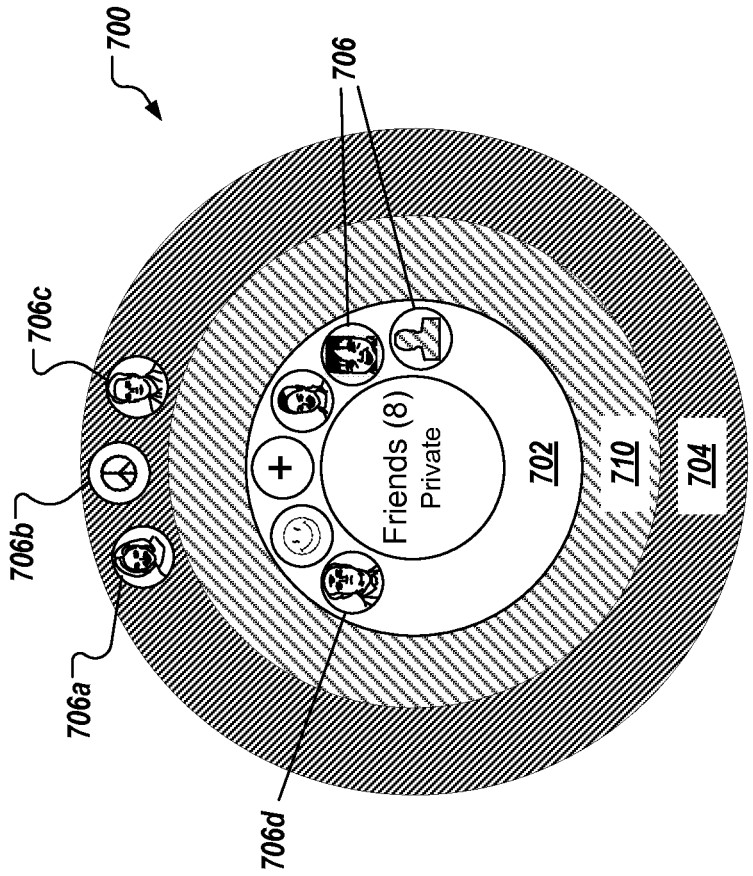
Figure 7C:
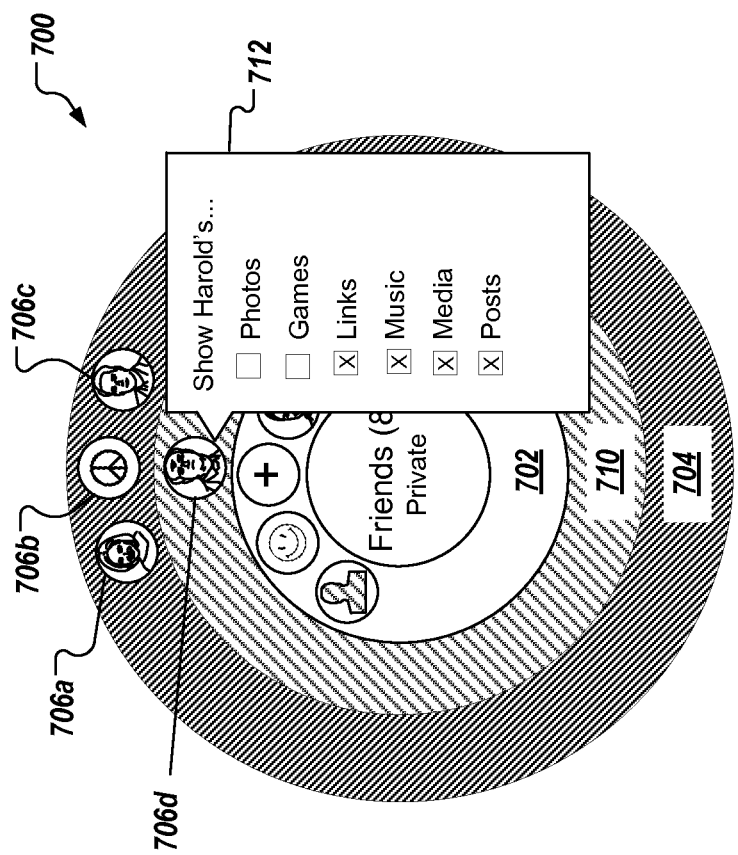

FIGS. 7A-7C depict another example GUI 700 for managing contact digital content within a social circle. In the depicted example, the GUI 700 is a graphical representation of the "Friends" social circle, and includes regions 702, 704, 710 and icons 706. The icons 706 are graphical representations of contacts that are members of the social circle. In the depicted example, the regions 702, 704 are associated with the same distribution settings as the regions 502, 504, respectively, as discussed above. That is, the region 702 represents contacts whose digital content that is distributed to the user will be displayed to the user, and the region 704 represents contacts whose digital content distributed to the user will be filtered from display to the user. In the depicted example, the region 710 is provided as an intermediate region that enables nuanced filtering of digital content distributed by contacts, as discussed in further detail herein.

FIG. 7A depicts the same settings as FIG. 5C. That is, icons 706a, 706b, 706c, associated with the contacts "Katie," "Debra," and "Geoff," respectively, are located in the region 704. In this manner, digital content distributed by the contacts "Katie," "Debra," and/or "Geoff" is filtered from display to the user. An icon 706d represents a contact "Harold." In FIG. 7A, because the icon 706d is located within the region 702, digital content distributed by the contact "Harold" (and/or other contacts within the region 702) to the user is displayed to the user. Accordingly, the stream page 400 of FIG. 6 can provide an example of items of digital content that can be displayed of the user based on settings of the GUI 700 of FIG. 7A. In the example of FIG. 6, the item 408 from the contact "Harold" represents shared images, the item 600 represents the progress of the contact "Harold" with respect to an online game, and the item 604 represents a post sent from the contact "Harold.". As discussed in further detail below, the region 710 enables selective filtering of digital content from particular contacts based on digital content type.

Referring now to FIGS. 7B and 7C, the GUI 700 enables nuanced filtering of digital content to be displayed to the user. In some implementations, a drag-and-drop technique can be used to move icons 506 between the regions 702, 704, 710. FIGS. 7B and 7C depict the use of a cursor 708 to drag the icon 706d, associated with the contact "Harold," from the region 702 to the region 710. In some implementations, when a contact is associated with an intermediate sub-group, such as an intermediate sub-group represented by the region 710, a dialog box 712 can be displayed. In the depicted example, the dialogue box 712 provides types or categories of digital content and enables the user to select particular categories of digital content that will be displayed to the user. Example categories can include photos (i.e., digital images), digital videos, online games, hyperlinks, music, media and posts. In the depicted example, categories provided in the dialogue box 712 include photos, games, links, music, media and posts, and the user has selected links, music, media and posts. Consequently, digital content corresponding to photos and/or links that are distributed by the contact "Harold" to the user will not be displayed to the user, and digital content corresponding to links, music, media and/or posts distributed by the contact "Harold" to the user will be displayed to the user.

FIG. 8 depicts a screen-shot of the example stream page 400 of FIGS. 4 and 6 showing the results of the contact digital content management shown in FIGS. 7A-7C. More specifically, FIG. 8 depicts the stream page 400 after being updated based on the settings defined by the GUI 700 of FIG. 7C. The stream page 400 of FIG. 8 includes the items 602, 604 and an item 800. As a consequence of the settings defined using the GUI 700 of FIG. 7C, the items 408, 600 (depicted in FIG. 6) are no longer displayed to the user. More specifically, because the categories photos and games are not selected for digital content distributed by the contact "Harold," the items 408, 600, which correspond to photos and games, respectively, are not displayed to the user. The item 604 represents content from the contact "Harold" in a category that the user has selected to be displayed. The item 602 from the contact "Tamara" and the item 800 from the contact "Sarah" both reflect the settings as shown in FIG. 7C, where icons associated with the contacts "Tamara" and "Sarah" are located in the region 702.

In some examples, by providing dialog boxes for each contact, the user is able to individually tailor the categories of digital content that will be presented from each contact in the social circle. In some implementations, one or more intermediate regions may be used with content settings that are pre-specified. For example, a first intermediate region can be associated with filtering of a first set of digital content categories and a second intermediate region can be associated with filtering of a second set of digital content categories. In some examples, the first set of digital content categories can be different from and/or overlap the second set of digital content categories. In this manner, the user can adjust which categories of digital content are to be filtered for a particular sub-group without adjusting categories for each contact within the sub-group. In some implementations, one or more intermediate regions can include default settings that can, for example, be adjusted by the user for any particular contact.

Figure 9:
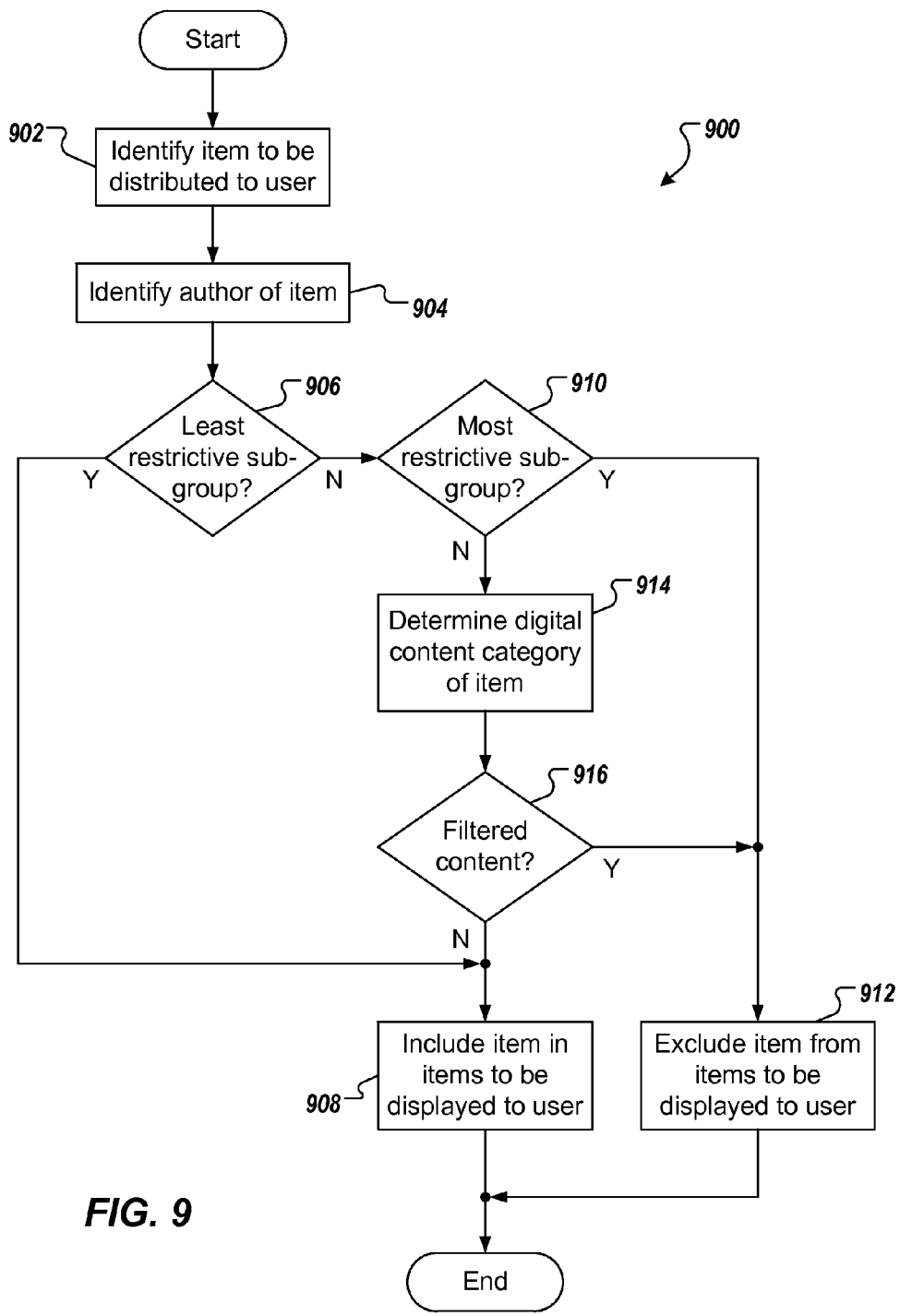
FIG. 9 is a flowchart of an example process that can be executed in implementations of the present disclosure.

FIG. 9 is a flowchart of an example process 900 that can be executed in implementations of the present disclosure. In some implementations, the example process 900 can include operations that are performed using one or more computer programs executed using one or more data processing apparatus (e.g., one or more client-side computing devices and/or one or more server-side computing devices). The example process 900 can be executed to determine whether an item should be presented to a user in a stream page.

An item that is to be distributed to a user is identified (902). For example, the item is generated and posted to the social networking service by an author and includes a distribution that includes the user. Consequently, the item is accessible, or otherwise visible to the user, such that the item can be displayed in a stream page of the user. In some examples, the item is identified in response to the user logging into the social networking service and/or a user request to display items in a stream page of the user. The author of the item is determined (904). In some examples, the author of the item can be determined from an identifier provided in a data set associated with the item. It can be determined that the author is a member of a social grouping (e.g., social circle) defined by the user.

It is determined whether the author is associated with a least restrictive sub-group (906). In some examples, the least restrictive sub-group is associated with settings that enable all content distributed by the author to be displayed to the user. For example, it can be determined whether the author is assigned to a sub-group associated with the region 502,702 of the GUI 500 or the GUI 700, respectively. If the author is associated with the least restrictive sub-group, the item is included in items that are to be displayed to the user (e.g., on a stream page) (908). If the author is not associated with a least restrictive sub-group, it can be determined whether the author is associated with the most restrictive sub-group (910). In some examples, the most restrictive sub-group is associated with settings that filter all content distributed by the author from being displayed to the user. For example, it can be determined whether the author is assigned to a sub-group associated with the region 504,704 of the GUI 500 or the GUI 700, respectively. If the author is associated with the most restrictive sub-group, the item is excluded from items that are to be displayed to the user (e.g., on a stream page) (912). If the author is not associated with the most restrictive sub-group, a digital content category of the item can be determined (914). It can be determined whether to filter the digital content based on the category (916). For example, the category of the item can be compared to a list of digital content categories associated with the author that encompass digital content that is to be displayed to the user. If the category is provided in the list of digital content categories, the item is not filtered and the item is included in items that are to be displayed to the user (e.g., on a stream page) (908). If the category is not provided in the list of digital content categories, the item is excluded from items that are to be displayed to the user (e.g., on a stream page) (912).

4. Conclusion

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be realized in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet. Actions as described herein may be carried out on a distributed system, a multiprocessor system, and/or one or more virtual machines operating over a distributed architecture such as cloud.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results.

What is claimed is:

1. A computer-implemented method executed using one or more computing devices, the method comprising:
    defining, using the one or more computing devices, a first group of contacts, the first group of contacts having been specified by a first user of a social networking service and comprising contacts of the first user within the social networking service each contact in the first group of contacts being associated with a first sub-group of contacts within the first group of contacts, the first group of contacts comprising a second user and a third user being associated with a distribution scheme for digital content provided by the first user within the social networking service; and
    associating, using the one or more computing devices, based on first input provided by the first user, one or more contacts of the first sub-group of contacts with a second sub-group of contacts within the first group of contacts,
    determining that the third user is a member of the second sub-group, the second sub-group of contacts comprising contacts for which at least some digital content from the third user distributed to the first user is excluded from display to the first user, and other digital content from the second user is displayed to the first user and excluded from display to the third user, based on the determining.

2. The method of claim 1, further comprising:
    defining, using the one or more computing devices, an item of digital content and a distribution associated with the item of digital content based on input provided by the first user, the distribution comprising the first group of contacts; and distributing the item of digital content to contacts within both the first sub-group of contacts and the second sub-group of contacts through the social networking service.

3. The method of claim 1, further comprising:
defining, using the one or more computing devices, an item of digital content and a distribution associated with the item of digital content based on input provided by the second user of the social networking service, the distribution comprising the first user; determining, using the one or more computing devices, that the second user is a member of the second sub-group; and based at least in part on determining that the second user is a member of the second sub-group, excluding the item from items that are to be displayed to the first user.

4. The method of claim 3, further comprising determining that the item of digital content comprises a specified type of digital content, wherein excluding the item from items that are to be displayed to the first user is in response to determining that the second user is a member of the second sub-group excluding the item from items that are to be displayed to the first user and determining that the item of digital content comprises the specified type of digital content.

5. The method of claim 4, wherein the specified type of digital content comprises at least one of music, hyperlinks, photos, videos and games.

6. The method of claim 1, further comprising:
defining an item of digital content and a distribution associated with the item of digital content based on input provided by the second user of the social networking service, the distribution comprising the first user;
determining that the second user is a member of the first sub-group; and
at least partially in response to determining that the second user is a member of the first sub-group, including the item in items that are to be displayed to the first user.

7. The method of claim 6, further comprising:
defining a second item of digital content and a second distribution associated with the second item of digital content based on input provided by the third user of the social networking service, the second distribution comprising the first user;
at least partially in response to the determining that the third user is a member of the second sub-group, excluding the second item from items that are to be displayed to the first user; and
displaying the items that are to be displayed to the first user, including the item of digital content from the second user and excluding the second item of digital content from the third user.

8. The method of claim 1, further comprising associating, based on second input provided by the first user, one or more contacts of at least one of the first sub-group of contacts and the second sub-group of contacts with a third sub-group of contacts within the first group of contacts, the third sub-group of contacts comprising contacts for which all digital content distributed to the first user is filtered from display to the first user.

9. The method of claim 1, wherein the second sub-group of contacts comprises contacts for which all digital content distributed to the first user is filtered from display to the first user.

10. Non-transitory computer storage media encoded with one or more computer programs, the one or more computer programs comprising instructions that when executed by data processing apparatus cause the data processing apparatus to perform operations comprising:
defining a first group of contacts, the first group of contacts having been specified by a first user of a social networking service and comprising contacts of the first user within the social networking service, each contact in the first group of contacts being associated with a first sub-group of contacts within the first group of contacts, the first group of contacts comprising a second user and a third user being associated with a distribution scheme for digital content provided by the first user within the social networking service; and
associating, based on first input provided by the first user, one or more contacts of the first sub-group of contacts with a second sub-group of contacts within the first group of contacts,
determining that the third user is a member of the second sub-group, the second sub-group of contacts comprising contacts for which at least some digital content from the third user distributed to the first user is excluded from display to the first user, and other digital content from the second user is displayed to the first user and excluded from display to the third user, based on the determining.

11. The non-transitory computer storage media of claim 10, the operations further comprising:
defining an item of digital content and a distribution associated with the item of digital content based on input provided by the first user, the distribution comprising the first group of contacts; and
distributing the item of digital content to contacts within both the first sub-group of contacts and the second sub-group of contacts through the social networking service.

12. The non-transitory computer storage media of claim 10, the operations further comprising:
defining an item of digital content and a distribution associated with the item of digital content based on input provided by the second user of the social networking service, the distribution comprising the first user;
determining that the second user is a member of the second sub-group; and
based at least in part on determining that the second user is a member of the second sub-group, excluding the item from items that are to be displayed to the first user.

13. The non-transitory computer storage media of claim 12, the operations further comprising determining that the item of digital content comprises a specified type of digital content, wherein excluding the item from items that are to be displayed to the first user is in response to determining that the second user is a member of the second sub-group excluding the item from items that are to be displayed to the first user and determining that the item of digital content comprises the specified type of digital content.

14. The non-transitory computer storage media of claim 13, wherein the specified type of digital content comprises at least one of music, hyperlinks, photos, videos and games.

15. The non-transitory computer storage method of claim 10, the operations further comprising:
defining an item of digital content and a distribution associated with the item of digital content based on input provided by the second user of the social networking service, the distribution comprising the first user;
determining that the second user is a member of the first sub-group; and
at least partially in response to determining that the second user is a member of the first sub-group, including the item in items that are to be displayed to the first user.

16. The non-transitory computer storage media of claim 15, the operations further comprising:
defining a second item of digital content and a second distribution associated with the second item of digital content based on input provided by the third user of the social networking service, the second distribution comprising the first user;

determining that the third user is a member of the second sub-group;

at least partially in response to determining that the third user is a member of the second sub-group, excluding the second item from items that are to be displayed to the first user; and displaying the items that are to be displayed to the first user, including the item of digital content from the second user and excluding the second item of digital content from the third user.

17. The non-transitory computer storage media of claim 10, the operations further comprising associating, based on second input provided by the first user, one or more contacts of at least one of the first sub-group of contacts and the second sub-group of contacts with a third sub-group of contacts within the first group of contacts, the third sub-group of contacts comprising contacts for which all digital content distributed to the first user is filtered from display to the first user.

18. The non-transitory computer storage media of claim 10, wherein the second sub-group of contacts comprises contacts for which all digital content distributed to the first user is filtered from display to the first user.

19. A computer-implemented method executed using one or more computing devices, the method comprising:

creating, using the one or more computing devices, a first group of digital contacts, the first group of digital contacts having been specified by a first user of a social networking service and comprising digital contacts of the first user within the social networking service, the first group of digital contacts comprising a second user and a third user being associated with a distribution scheme for digital content provided by the first user within the social networking service;

associating, using the one or more computing devices, based on first input provided by the first user, one or more digital contacts from the first group of contacts with a second sub-group of contacts;

receiving, at the one or more computing devices, an indication of an item of digital content and a distribution associated with the item of digital content from the second user of the social networking service, the distribution comprising the first user;

determining, using the one or more computing devices, that the second user is a member of the second sub-group; and based at least in part on determining that the second user is a member of the second sub-group, excluding the item of digital content from the second user from items that are to be displayed to the first user and the third user, and including another item of the digital content from the third user in the items that are to be displayed to the first user.

20. The method of claim 19, the method further comprising:

determining that the item of digital content is associated with a predefined type of digital content;

wherein excluding the item of digital content from items that are to be displayed to the first user comprises excluding the item of digital content based at least in part on determining that the second user is a member of the second sub-group and determining that the item of digital content is associated with a predefined type of digital content.

21. The method of claim 19, the method further comprising:

receiving, at the one or more computing devices, an indication of a second item of digital content and a second distribution associated with the second item of digital content from the third user of the social networking service, the second distribution comprising the first user;

determining that the third user is not a member of the second sub-group; and at least partially based on determining that the second user is not a member of the second sub-group, including the second item of digital content in items that are to be displayed to the first user.

22. The method of claim 21, the method further comprising:

displaying the items that are to be displayed to the first user, including the second item of digital content from the third user and excluding the item of digital content from the second user.

23. A system comprising:

one or more computing devices; and a computer-readable medium coupled to the one or more computing devices and having instructions stored thereon which, when executed by the one or more computing devices, cause the one or more computing devices to perform operations comprising:

creating, using the one or more computing devices, a first group of digital contacts, the first group of digital contacts having been specified by a first user of a social networking service and comprising digital contacts of the first user within the social networking service, the first group of digital contacts comprising a second user and a third user being associated with a distribution scheme for digital content provided by the first user within the social networking service;

associating, using the one or more computing devices, based on first input provided by the first user, one or more digital contacts from the first group of contacts with a second sub-group of contacts;

receiving, at the one or more computing devices, an indication of an item of digital content and a distribution associated with the item of digital content from a second user of the social networking service, the distribution comprising the first user;

determining, using the one or more computing devices, that the second user is a member of the second sub-group; and based at least in part on determining that the second user is a member of the second sub-group, excluding the item of digital content from the second user from items that are to be displayed to the first user and the third user, and including another item of the digital content from the third user in the items that are to be displayed to the first user.

24. The system of claim 23, the operations further comprising:

determining that the item of digital content is associated with a predefined type of digital content;

wherein excluding the item of digital content from items that are to be displayed to the first user comprises excluding the item of digital content based at least in part on determining that the second user is a member of the second sub-group and determining that the item of digital content is associated with a predefined type of digital content.

25. The system of claim 23, the operations further comprising:

receiving, at the one or more computing devices, an indication of a second item of digital content and a second distribution associated with the second item of digital content from the third user of the social networking service, the second distribution comprising the first user;

determining that the third user is not a member of the second sub-group; and at least partially based on determining that the second user is not a member of the second sub-group, including the second item of digital content in items that are to be displayed to the first user.

26. The system of claim 25, the operations further comprising:

displaying the items that are to be displayed to the first user, including the second item of digital content from the third user and excluding the item of digital content from the second user.

* * * * *